Nov. 14, 1950 — R. R. SUTTON — 2,530,213
TUBELESS TIRE
Filed May 24, 1948
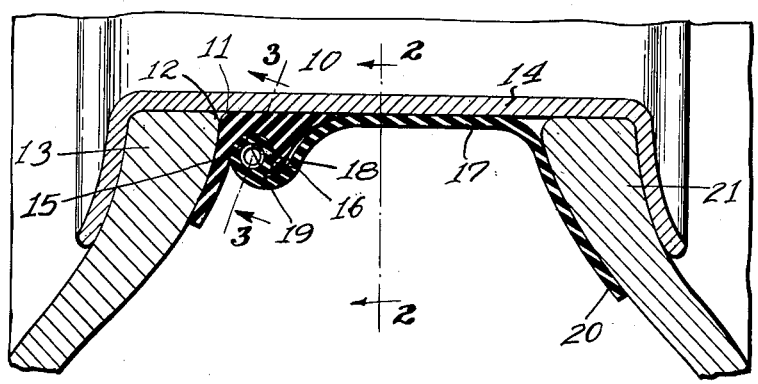
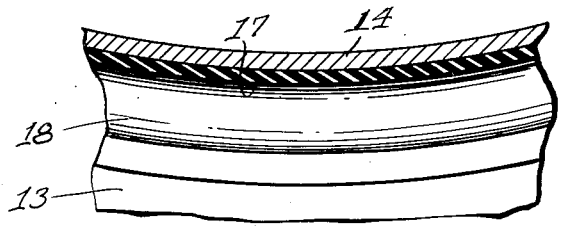
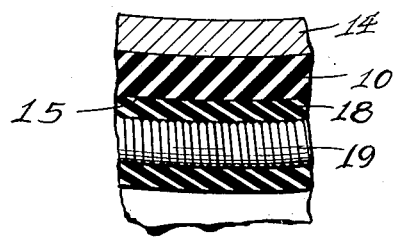
Inventor
Roy R. Sutton
By Wilfred Lawson
Attorney Patented Nov. 14, 1950

2,530,213

UNITED STATES PATENT OFFICE 2,530,213

TUBELESS TIRE

Roy R. Sutton, Winfield, Kans.

Application May 24, 1948, Serial No. 28,822

1 Claim. (Cl. 152—363)

The invention relates to automobile tires and the like and more particularly to tubeless tires. The primary object of the invention is to provide a tireless clincher tire equipped with an annular flap extending between the tire clinchers inside the tire and adapted to be forced against the rim by the pressure of the air in the tire.

Another object of the invention is to provide a tire of the character indicated above, wherein a female clincher is formed on or vulcanized onto the inner edge portion of one of the tire clinchers over its entire circumference and the flap is equipped at one of its circumferential edges with a male clincher adapted to enter and engage the female clincher.

A further object of the invention is to provide a tire of the character indicated above, wherein the edge portion of flap opposite to the male clincher is smoothly attached to the inside of the tire clincher opposite to the female clincher.

Other objects of the invention not specifically mentioned may appear in the following specification describing the invention with reference to the accompanying drawing illustrating a preferred embodiment of the invention. It is, however, to be understood that the invention is not to be limited or restricted to the exact construction and combination of parts described in the specification and shown in the drawing, but that such changes and modifications can be made, which fall within the scope of the claim appended hereto.

In the several figures of the drawing, similar parts are indicated by similar reference characters, and Figure 1 is a fragmentary view in cross section of a tire embodying the invention and applied to a wheel.

Figure 2 is a fragmentary sectional view taken substantially on the line 2—2 of Figure 1, and Figure 3 is an enlarged detail sectional view taken substantially on the line 3—3 of Figure 1.

The clincher tire embodied herein comprises a reinforcement ring 10 having a substantially triangular cross section with an obtuse apex angle, 11. The apex of the reinforcing ring 10 is located adjacent the inner circumferential edge 12 of one of the tire clinchers 13 and the reinforcing ring 10 is either formed integrally with or secured to the inside surface of the tire clincher 13 by cementing, vulcanizing or the like. The ring is arranged so that one of the sides of it abuts the inside surface of the tire clincher, the other side extends inwardly of the tire from the inner circumferential edge 12 so that it is arranged adjacent to the wheel rim 14, when the tire is mounted on said rim. Intermediate the edges of the base of the reinforcing ring extending from the end of the first mentioned side of the ring to the end of the other side of the ring a clinch groove 15 is provided in the reinforcing ring 10 and extends about the entire ring. The clinch groove has a partly circular inner surface forming at its inner edge a circular rib 16 with the base of the reinforcing rib 10.

An annular flap 17 is equipped at one of its edges with a male clincher enlargement 18 adapted to be fitted snugly into the clincher groove 15. A helical spring 19 is arranged inside the male clincher enlargement 18 and extends around the entire annular flap 17 to urge the clincher enlargement into firmer engagement with the clincher groove 15. The annular flap 17 extends smoothly over the reinforcing ring 10 and the other edge portion 20 of said annular flap lies flatly against the inside surface of the other tire clincher 21.

The tire is mounted on the rim 14 in the conventional manner and is then inflated by pumping air into said tire. The air pressure forces the flap 17 against the rim 14 and against the inside of the secondly mentioned tire clincher 21 and presses also the rib 16 on the reinforcing ring 10 against the clincher enlargement 18, so that the tire will be sealed securely against any air leakage. When desired the edge portion 20 of the annular flap may be vulcanized or cemented onto the inside surface of the tire clincher 21.

I claim:

A tubeless tire comprising a casing having thickened rim engaging portions, an annular reinforcement substantially L-shaped in cross-section secured along the inner side edge of one of said rim engaging portions with one of its sides adapted to lay flat against the surface of the rim, said one side of said reinforcement having a groove formed in its outer surface, a flap having one of its side edges secured along the inner side edge of the other of said rim engaging portions and adapted to span the gap between the latter, and a coiled spring housed within the other side edge of said flap and adapted to seat in said groove when said casing is mounted on said rim and inflated.

ROY R. SUTTON.

REFERENCES CITED

The following references are of record in the file of this patent:

UNITED STATES PATENTS

| Number | Name | Date |
|---|---|---|
| 631,599 | Trench | Aug. 22, 1899 |
| 707,538 | Baker | Aug. 26, 1902 |
| 736,414 | Litchfield | Aug. 18, 1903 |
| 747,001 | Seddon | Dec. 15, 1903 |
| 1,919,910 | Shoemaker | July 25, 1933 |

FOREIGN PATENTS

| Number | Country | Date |
|---|---|---|
| 2,782 | Great Britain | 1892 |